(12) United States Patent
Oka et al.

(10) Patent No.: US 7,460,128 B2
(45) Date of Patent: Dec. 2, 2008

(54) IMAGE DRAWING APPARATUS

(75) Inventors: Takahiro Oka, Kawasaki (JP); Munenori Takimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 11/060,502

(22) Filed: Feb. 18, 2005

(65) Prior Publication Data
US 2006/0092166 A1    May 4, 2006

(30) Foreign Application Priority Data
Nov. 4, 2004   (JP)   ............... 2004-321008

(51) Int. Cl.
G09G 5/37   (2006.01)
(52) U.S. Cl. .................... 345/562; 345/581
(58) Field of Classification Search ............. None
See application file for complete search history.

(56) References Cited

U.S. PATENT DOCUMENTS

| 4,718,024 | A | | 1/1988 | Guttag et al. |
| 5,295,202 | A | * | 3/1994 | Steinkirchner et al. ...... 382/167 |
| 6,414,692 | B1 | * | 7/2002 | Takimoto .................... 345/620 |
| 2003/0095128 | A1 | | 5/2003 | Yamada et al. |
| 2003/0156220 | A1 | | 8/2003 | Narita |

FOREIGN PATENT DOCUMENTS

| JP | 7-74927 | 3/1995 |
| JP | 9-212410 | 8/1997 |
| JP | 2003-157433 | 5/2003 |

OTHER PUBLICATIONS

European Search Report and Annex dated Feb. 27, 2006 of Application No. 05 25 0893.

* cited by examiner

*Primary Examiner*—Kee M Tung
*Assistant Examiner*—Michelle K Lay
(74) *Attorney, Agent, or Firm*—Staas & Halsey LLP

(57) ABSTRACT

In an image drawing apparatus for conducting a data transfer at a bit unit for image data stored in a memory device, a region storing part stores a region where at least one attribute value concerning a pixel is not constant in the image data, an attribute value storing part stores each attribute value of pixels in the region, a constant value storing part stores a constant value as the attribute value, an inside region determining part determines whether or not a coordinate being transferred is within the region, and a selection signal generating part selects one of the attribute value storing part as a selected storing part and the constant value storing part based on a determination result obtained by the inside region determining part, and generating a selection signal indicating the selected storing part, wherein a predetermined process for source image data is conducted by obtaining the attribute value from the selected storing part.

12 Claims, 13 Drawing Sheets

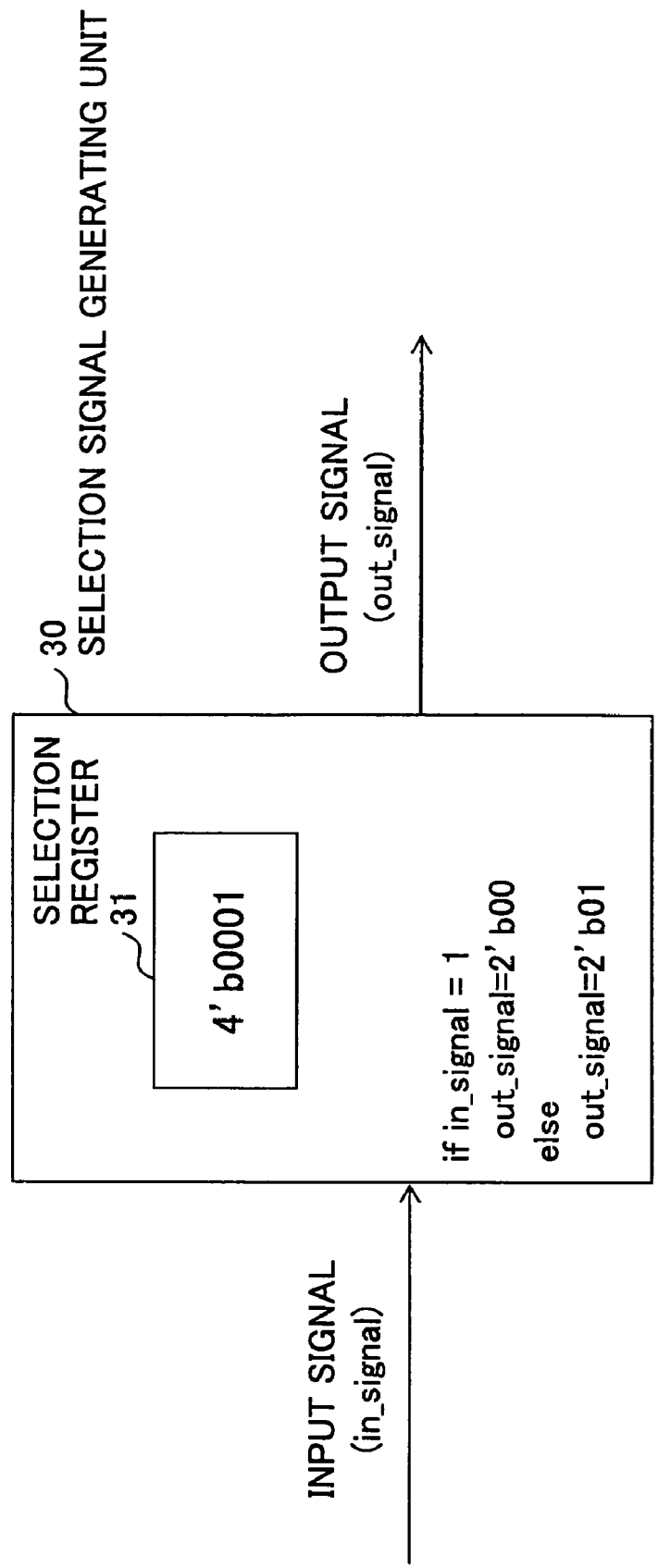

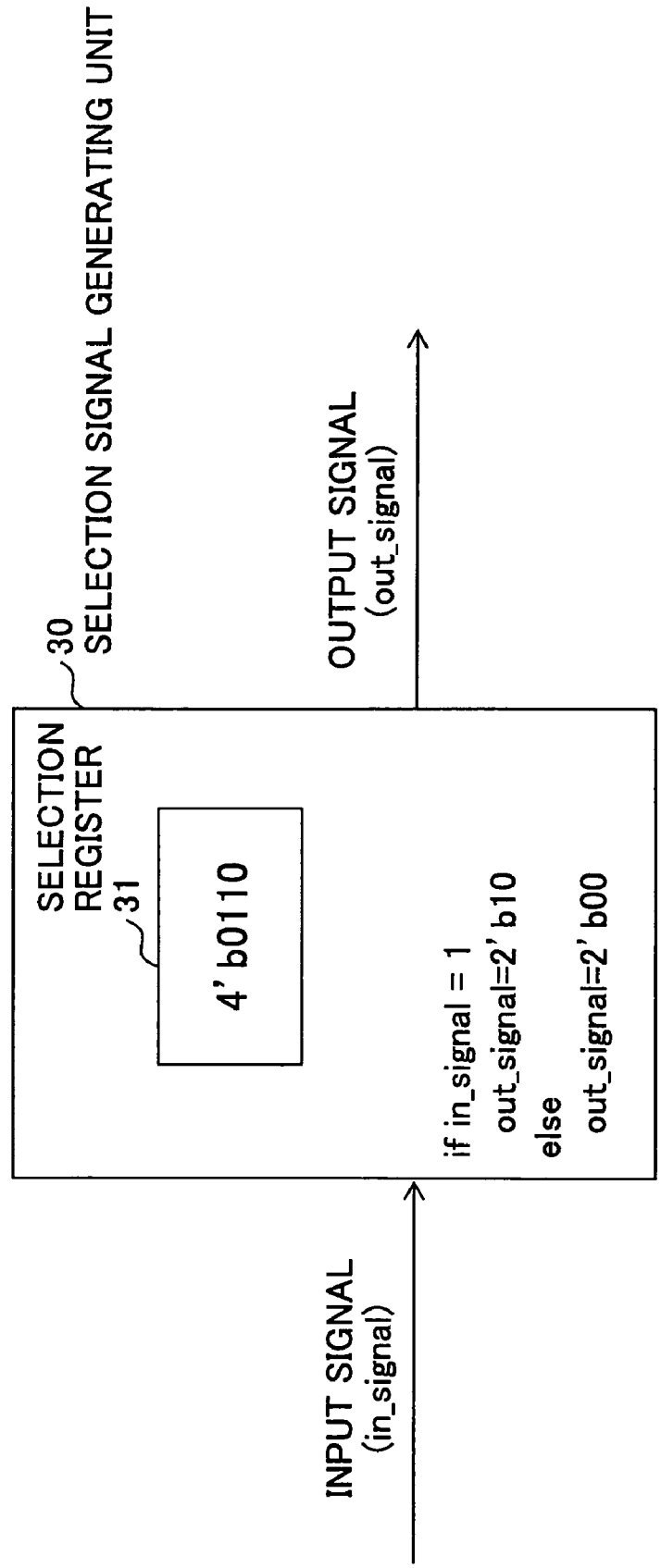

IMAGE DRAWING APPARATUS

CROSS-REFERENCE TO RELATED APPLICATIONS

This application is based upon and claims priority of Japanese Patent Application No. 2004-321008 filed on Nov. 4, 2004, the entire contents of which are hereby incorporated by reference.

BACKGROUND OF THE INVENTION

1. Field of the Invention

The present invention generally relates to image drawing apparatuses for conducting a data transfer by a bit unit with respect to image data being stored in an arbitrary rectangle region in a memory device, and more particularly to an image drawing apparatus that can transfer an image including both a portion where a transmission coefficient is constant and a portion where the transmission coefficient is not constant by one data transfer.

2. Description of the Related Art

Japanese Laid-open Patent Applications No. 7-74927 and No. 9-212410 disclose image drawing apparatuses in that when a data transfer function (hereinafter, called a BITBLT transfer) by a bit unit is conducted with respect to image data stored in an arbitrary block region (or rectangle region) of a memory device, transmission coefficient data (or pixel value) are set in a register when the transmission coefficient data (pixel value) are constant, the transmission coefficient data are read out, and then a transmission drawing process is conducted based on the transmission coefficient data.

Japanese Laid-open Application No. 2003-157433 discloses an image drawing apparatus in that all transmission coefficient data (all pixel values) for the image data are stored in the memory device when the transmission coefficient data (pixel value) are different for each pixel, and the transmission coefficient data are read out for each pixel.

Alternatively, when the transmission coefficient data (pixel value) are given as a function between pixels, a value (memory reference value) stored in the memory device or a value given by a function in a register is read out.

In the above-described conventional image drawing apparatuses, only one of the above three functions is available for a single BITBLT transfer. Accordingly, in a case of a typical icon image as shown in FIG. 1A, even if the transmission coefficient is constant on a periphery of an arrow image, it is required to store transmission coefficients for all pixels in the memory device, and read out a respective transmission coefficient for each pixel. In this case, a larger amount of area blocks of the memory device is unnecessarily used.

On the other hand, as shown in FIG. 1B, it is considered that the icon image is divided into portions where the transmission coefficient is constant and a portion where the transmission coefficient is not constant. In this case, it is required to divide into five rectangle regions and conduct the BITBLT transfer five times. Accordingly, a data amount to transfer becomes larger.

That is, when the BITBLT transfer is conducted with respect to an image including both a portion where the transmission coefficient is constant and a portion where the transmission coefficient is not constant in the image, it is required to store the transmission coefficients for all pixels in the memory device or to divide the rectangle area of the image into a plurality of rectangle regions and conduct the BITBLT transfer for each divided rectangle regions. Accordingly, a larger area used to store the transmission coefficients in the memory device is needed and a larger amount of data to is transferred. In addition, a plurality of the BITBLT transfers makes it complicated.

SUMMARY OF THE INVENTION

It is a general object of the present invention to provide an image drawing apparatus in which the above-mentioned problems are eliminated.

A more specific object of the present invention is to provide an image drawing apparatus that can transfer an image including both a portion where a transmission coefficient is constant and a portion where the transmission coefficient is not constant by using one data transfer.

The above objects of the present invention are achieved by an image drawing apparatus for conducting a data transfer at a bit unit for image data stored in a memory device, including: a region storing part storing a region where at least one attribute value concerning a pixel is not constant in the image data; an attribute value storing part storing each attribute value of pixels in the region; a constant value storing part storing a constant value as the attribute value; an inside region determining part determining whether or not a coordinate being transferred is within the region; and a selection signal generating part selecting one of the attribute value storing part as a selected storing part and the constant value storing part based on a determination result obtained by the inside region determining part, and generating a selection signal indicating the selected storing part, wherein a predetermined process for source image data is conducted by obtaining the attribute value from the selected storing part.

According to the above invention, it is possible to conduct a data transfer (BITBLT transfer) for the image data including a portion where the transmission coefficient as the attribute value is constant and a portion where the transmission coefficient as the attribute value is not constant during a single process of the data transfer.

BRIEF DESCRIPTION OF THE DRAWINGS

Other objects, features and advantages of the present invention will become more apparent from the following detailed description when read in conjunction with the accompanying drawings, in which:

FIG. 9A and FIG. 9B are diagrams for explaining the process conducted in the selection signal generating unit according to the embodiment of the present invention;

DESCRIPTION OF THE PREFERRED EMBODIMENTS

An embodiment according to the present invention will be described with reference to the accompanying drawings.

A mechanism for conducting a BITBLT transfer (Bit Block Transfer) at higher speed with respect to an image created by a bitmap will be described.

Figure 1B:
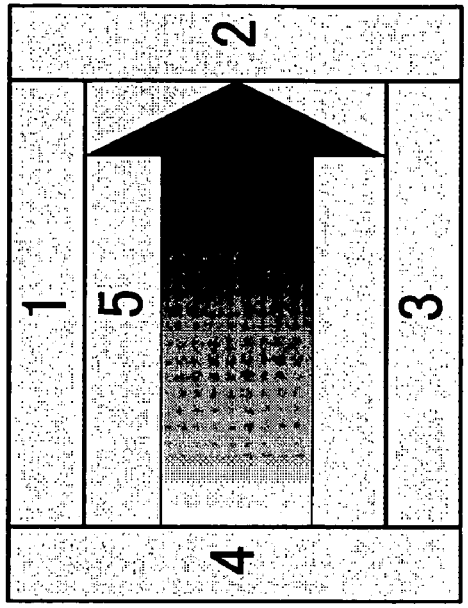
FIG. 1A is a diagram showing an example of an image and FIG. 1B is a diagram showing the conventional BITBLT transfer conducted for the image shown in FIG. 1A.
Figure 1A:
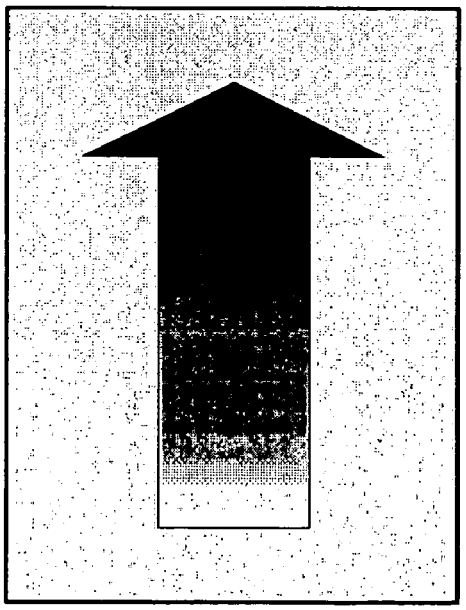
Figure 2:
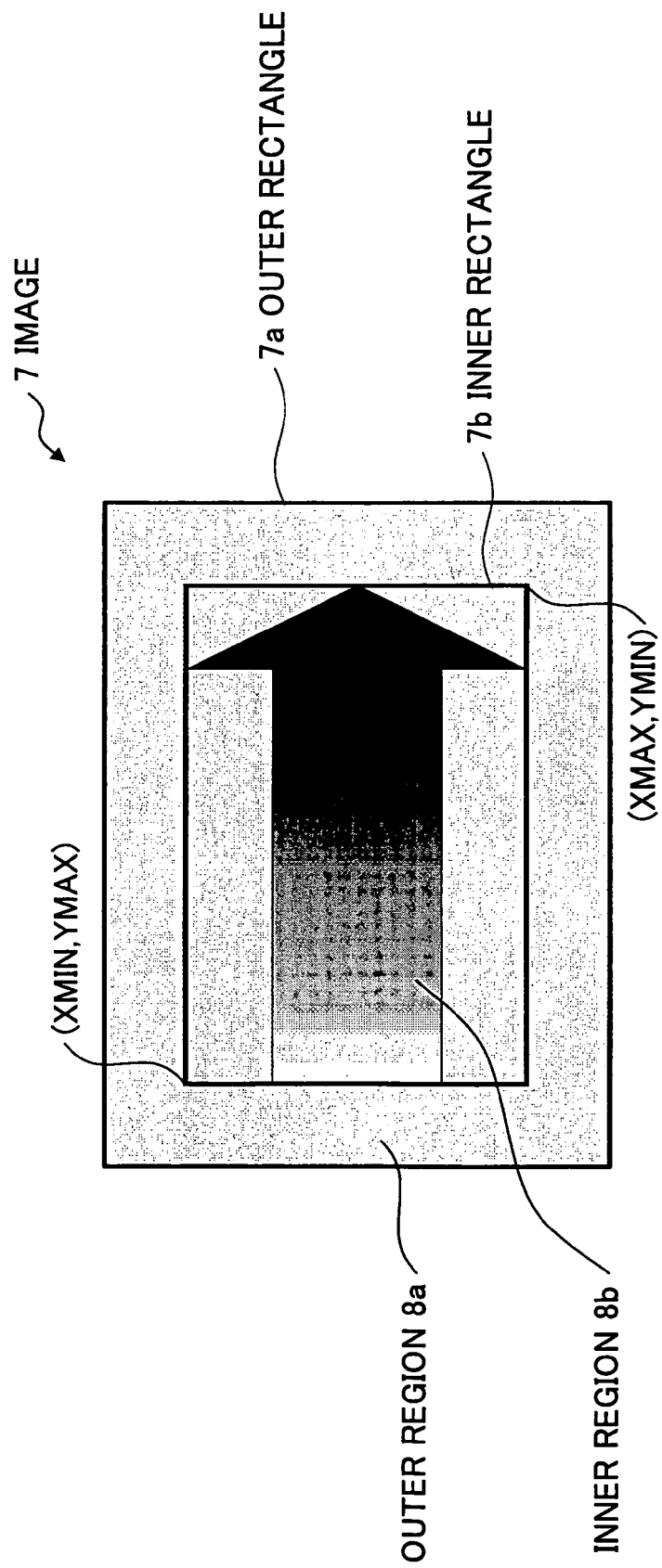
FIG. 2 is a diagram explaining for a method for executing a BITBLT transfer in an image drawing apparatus according to an embodiment of the present invention.

FIG. 2 is a diagram explaining for a method for executing the BITBLT transfer in an image drawing apparatus according to an embodiment of the present invention. In FIG. 2, an image 7 showing a right pointing arrow used as an icon is illustrated, but the present invention is not limited to the image 7 showing the right pointing arrow. The image 7 is created by using the bitmap.

In the image 7 shown in FIG. 2, an inner rectangle 7b including a inner portion where a transmission coefficient is not constant is a rectangle a coordinate of which upper left corner is (XMIN, YMAX) and a coordinate of which lower right corner is (XMAX, YMIN). For example, these two coordinates are set in predetermined registers, respectively, by a host such as software or a like positioned at an upper device.

By using a circuit configuration for determining whether or not coordinates of source image data is located within an inner region 8b being an inner region of the inner rectangle 7b that is defined by these two coordinates (XMIN, YMAX) and (XMAX, YMIN), when it is determined that the coordinates of the source image data are located within an outer region 8a being a region between an outer rectangle 7a and the inner rectangle 7b in that the region shows that the transmission coefficient is constant, the BITBLT transfer is conducted with respect to the source image data at a predetermined transfer coefficient. On the other hand, when it is determined that the coordinates of the source image data are located within the inner region 8b, the BITBLT transfer is conducted with respect to the image data in accordance with the transmission coefficient.

Since the BITBLT transfer is conducted for two regions only: the outer region 8a where the transmission coefficient is constant and the inner region 8b where the transmission coefficient is not constant, it is possible to simplify the BITBLT transfer and to improve a speed of the BITBLT transfer to be higher.

Figure 3:
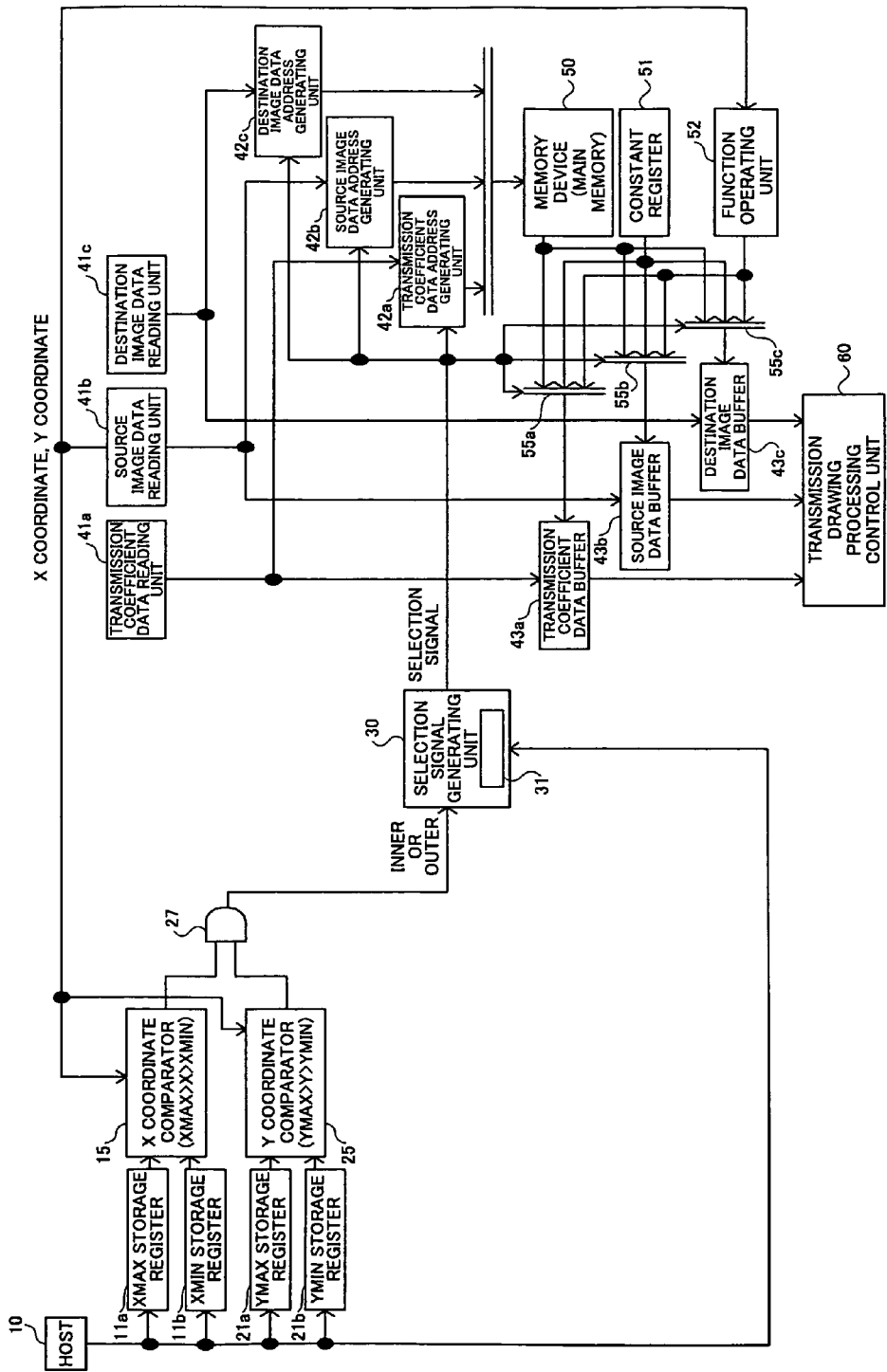
FIG. 3 is a block diagram showing a first circuit configuration according to the embodiment of the present invention.

A basic circuit configuration for realizing the method for conducting the BITBLT transfer described above with reference to FIG. 2 will be described as a first circuit configuration with reference to FIG. 3. FIG. 3 is a block diagram showing the first circuit configuration according to the embodiment of the present invention.

In FIG. 3, an image drawing apparatus 100 is an apparatus controlled by a CPU (Central Processing Unit) and includes an image drawing function using the bitmap, and includes a host 10, an XMAX storage register 11a, an XMIN storage register 11b, a YMAX storage register 21a, a YMIN storage register 21b, an X coordinate comparator 15, a Y coordinate comparator 25, an AND circuit 27, a selection signal generating unit 30, a transmission coefficient data reading unit 41a, a source image data reading unit 41b, a destination image data reading unit 41c, a transmission coefficient data address generating unit 42a, a source image data address generating unit 42b, a destination image data address generating unit 42c, a transmission coefficient data buffer 43a, a source image data buffer 43b, a destination image data buffer 43c, a memory device (main memory) 50, a constant register 51, a function operating unit 52, selectors 55a, 55b, and 55c, and a transmission drawing processing control unit 60.

The host 10 is the upper device such as software (for example, an operating system) for controlling the entire image drawing apparatus 100.

The XMAX storage register 11a is a register for storing a value of the XMAX of the X coordinate concerning two coordinates described in FIG. 2 in that the two coordinates are set by the host 10. The XMIN storage register 11b is a register for storing a value of the XMIN of the X coordinate concerning two coordinates described in FIG. 2 in that the two coordinates are set by the host 10. The YMAX storage register 21a is a register for storing a value of the YMAX of the Y coordinate concerning two coordinates described in FIG. 2 in that the two coordinates are set by the host 10. The YMIN storage register 21b is a register for storing a value of the YMIN of the Y coordinate concerning two coordinates described in FIG. 2 in that the two coordinates are set by the host 10.

The X coordinate comparator 15 is a comparator for comparing the X coordinate in the image 7 with XMIN and XMAX. When XMIN<X<XMAX, it is determined as "true". On the other hand, when X$\leq$XMIN or XMAX$\leq$X, it is determined as "false". The Y coordinate comparator 25 is a comparator for comparing the Y coordinate in the image 7 with YMIN and YMAX. When YMIN<Y<YMAX, it is determined as "true". On the other hand, when Y$\leq$YMIN or YMAX$\leq$Y, it is determined as "false".

The AND circuit 27 conducts a logic operation AND for a comparison result of the X coordinate comparator 15 and a comparison result of the Y coordinate comparator 25, and sends out a value showing whether or not a coordinate in the image 7 is within the outer region 8a or the inner region 8b, to the selection signal generating unit 30. For example, a value showing "0" (zero) is sent out to the selection signal generating unit 30 when the coordinate is within the outer region 8a, and a value showing "1" is sent out to the selection signal generating unit 30 when the coordinate is within the outer region 8b.

The selection signal generating unit 30 determines a means to obtain the transmission coefficient and generates a selection signal. The selection signal generating unit 30 includes a selection register 31 for storing data showing the means to obtain the transmission coefficient, which is informed from the host 10 to select. As the means to obtain the transmission coefficient, any one of the memory device 50, the constant register 51, and the function operating unit 52 is selected. When the coordinate of source image data is within the outer region 8a or the inner region 8b, a respective means is selected to read out the transmission coefficient. The selection signal generated by the selection signal generating unit 30 is a signal specifying the means to obtain the transmission coefficient corresponding to the outer region 8a or the inner region 8b. The selection signal is sent to the transmission coefficient data address generating unit 42a, the source image data address generating unit 42*b*, the destination image data address generating unit 42*c*, and the selectors 55*a*, 55*b*, and 55*c*.

The transmission coefficient data reading unit 41*a* sends out a signal showing a transmission coefficient data read request to the transmission coefficient data address generating unit 42*a* and the transmission coefficient data buffer 43*a*, and stores the transmission coefficient data obtained from one of the memory device 50, the constant register 51, and the function operating unit 52, to the transmission coefficient data buffer 43*a*.

In response to the signal showing the transmission coefficient data read request from the transmission coefficient data reading unit 41*a*, when the selection signal received from the selection signal generating unit 30 indicates the memory device 50, that is, when an arbitrary block region (or rectangle region) of the memory device 50 is indicated as the transmission coefficient data, the transmission coefficient data address generating unit 42*a* reads location information showing a starting point of the block region and information showing a width in a longitudinal direction and a length in a lateral direction. The transmission coefficient data address generating unit 42*a* calculates an address of the transmission coefficient data corresponding to the block region, and sends out an address signal showing a read address with respect to the memory device 50. In response to the address signal, the transmission coefficient data stored at the read address are read out from the memory device 50, and are stored into the transmission coefficient data buffer 43*a*.

The source image data reading unit 41*b* scans the image 7 being rectangular while sequentially changing the X coordinate and the Y coordinate to transfer, and sends a signal showing the X coordinate and the Y coordinate being transferred to the X coordinate comparator 15 and the Y coordinate comparator 25. Simultaneously, the source image data reading unit 41*b* sends out a signal showing a source image data read request to the source image data address generating unit 42*b* and the destination image data buffer 43*b*. Then the source image data reading unit 41*b* stores the source image data obtained from one of the memory device 50, the constant register 51, and the function operating unit 52 to the source image data buffer 43*b*.

In response to the signal showing the source image data read request from the source image data reading unit 41*b*, when the selection signal received from the selection signal generating unit 30 indicates the memory device 50, that is, when an arbitrary block region of the memory device 50 indicates the source image data, the source image data address generating unit 42*b* receives location information showing a starting point of the block region and information showing a width in a longitudinal direction and a length in a lateral direction. The source image data address generating unit 42*b* calculates an address of the source image data corresponding to the block region, and sends out an address signal showing a read address with respect to the memory device 50. In response to the address signal, the source image data stored at the read address are read out from the memory device 50, and are stored into the source image data buffer 43*b*.

The destination image data reading unit 41*c* sends out a signal showing a source image data read request to the destination image data address generating unit 42*c* and the destination image data buffer 43*b*, and stores the source image data obtained from one of the memory device 50, the constant register 51, and the function operating unit 52 to the destination image data buffer 43*c*.

In response to the signal showing the destination image data read request from the destination image data reading unit 41*c*, when the selection signal received from the selection signal generating unit 30 indicates the memory device 50, that is, when an arbitrary block region of the memory device 50 is indicated as the destination image data, the destination image data address generating unit 42*c* receives location information showing a starting point of the block region and information showing a width in a longitudinal direction and a length in a lateral direction. The destination image data address generating unit 42*c* calculates an address of the source image data corresponding to the block region, and sends out an address signal showing a read address with respect to the memory device 50. In response to the address signal, the destination image data stored at the read address are read out from the memory device 50, and are stored into the destination image data buffer 43*c*.

The memory device 50 is a main memory. In a case in that an arbitrary block region of the memory device 50 is indicated as the transmission coefficient data, a transmission coefficient corresponding to each pixel of the image 7 is stored into the block region. Moreover, in a case in that an arbitrary block region of the memory device 50 is indicated as the source image data, each pixel value of the image 7 is stored as the source image data in the block region. Furthermore, in a case in that an arbitrary block region of the memory device 50 is indicated as the destination image data, each pixel value of the image 7 being a destination image is stored as the destination image data. In the embodiment, each pixel value is referred from the memory device 50.

In the constant register 51, a value for the outer region 8*a* having a constant transmission coefficient is set as a constant value.

The function operating unit 52 is an operating unit that calculates the transmission coefficient at the coordinate being transferred by using a function. For example, the function operating unit 52 is used to create a gradation.

When the memory device 50 is indicated by the selection signal received from the selection signal generating unit 30, the selector 55*a* sends the transmission coefficient data received from the memory device 50 to the transmission coefficient data buffer 43*a*. Similarly, when the selection signal indicates the constant register 51, the selector 55*a* sends a constant value received from the constant register 51 to the transmission coefficient data buffer 43*a*. Moreover, when the selection signal indicates the function operating unit 52, the selector 55*a* sends a value received from the function operating unit 52 to the transmission coefficient data buffer 43*a*. Similarly, the selector 55*b* sends data from the means indicated by the selection signal to obtain the transmission coefficient to the source image data buffer 43*b*. Moreover, the selector 55*c* sends data from the means indicated by the selection signal to obtain the transmission coefficient to the destination image data buffer 43*c*.

The transmission drawing processing control unit 60 nearly simultaneously receives the transmission coefficient data, the source image data, and the destination image data from the transmission coefficient data buffer 43*a*, the source image data buffer 43*b*, and the destination image data buffer 43*c*, respectively. The transmission drawing processing control unit 60 executes transmission drawing process by using the transmission coefficient data, and generates image data as an execution result. The image data generated as the execution result are stored in a predetermined storage area (for example, memory device 50).

As described above, in the image drawing apparatus 100 according to the present invention, with respect to the image 7 including the inner region 8*b* where the transmission coefficient is not constant, the inner region 8*b* is determined. Therefore, a single BITBLT transfer can transfer the entire image 7. In addition, it is possible to reduce a used area in the memory device 50 and a transmission amount.

As described above, in the embodiment, the outer region 8*a* and the inner region 8*b* are defined based on a determination whether or not the transmission coefficient in the image 7 is constant. However, a region where only the transmission coefficient is not constant, a region where only the pixel value is not constant, and a region where the transmission coefficient or the pixel value is not constant may be set based on a determination conducted by the host 10. In each case, it is possible to realize the BITBLT transfer at higher speed by applying the first circuit configuration. Similarly, in the following other circuit configuration, which will be described, the BITBLT transfer can be realized at higher speed.

Figure 4:
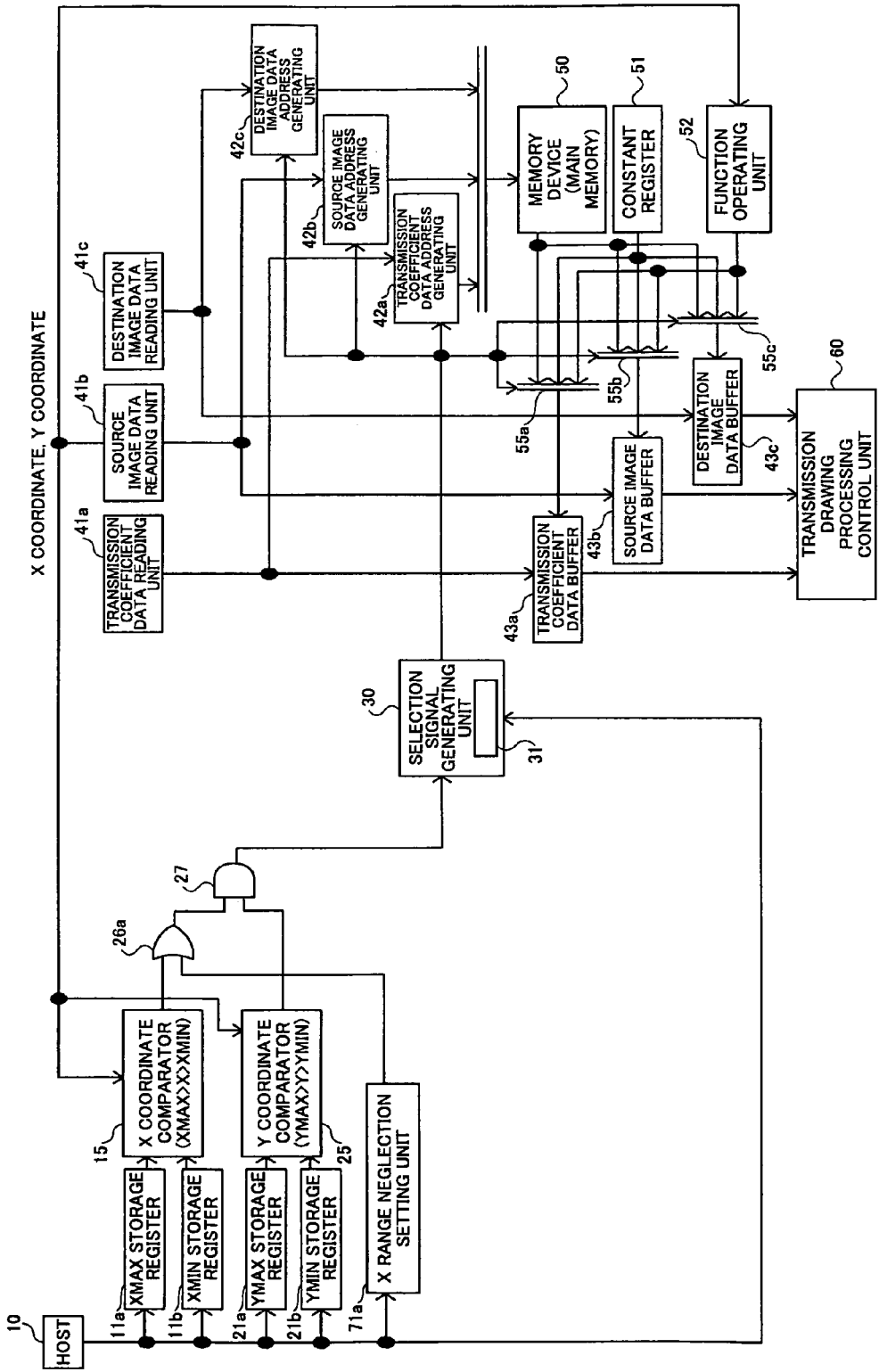
FIG. 4 is a block diagram showing a second circuit configuration of the image drawing apparatus according to the embodiment of the present invention.

Next, a case of neglecting a range of the X coordinate informed from the host 10 will be described with reference to FIG. 4. FIG. 4 is a block diagram showing a second circuit configuration of the image drawing apparatus according to the embodiment of the present invention. In FIG. 4, elements that are the same as the ones in FIG. 3 are indicated by the same reference numerals and the explanation thereof will be omitted. The image drawing apparatus 100 shown in FIG. 4 includes an X range neglection setting unit 71*a*, and an OR circuit 26*a* in addition to the first circuit configuration shown in FIG. 3.

The X range neglection setting unit 71*a* is a register used to store a value informed from the host 10. The host 10 sets the value so that the X coordinate being transferred always becomes within a range (that is, XMAX>X>XMIN), regardless of the comparison result of the X coordinate comparator 15. For example, the host 10 sets a value "1" into the X range neglection setting unit 71*a*, so that the X coordinate being transferred always becomes within the range, regardless of the comparison result of the X coordinate comparator 15. On the other hand, the host 10 sets a value "0" (zero) into the X range neglection setting unit 71*a*, when the comparison result showing whether or not the X coordinate being transferred is available.

The OR circuit 26*a* is provided between the X coordinate comparator 15 and the AND circuit 27. The OR circuit 26*a* conducts a logical addition with respect to the comparison result output from the X coordinate comparator 15 and a value input from the X range neglection setting unit 71*a*. Then, the OR circuit 26*a* sends a logic operation result to the AND circuit 27.

The AND circuit 27 conducts a logical product with respect to a value input from the OR circuit 26*a* and the comparison result of the Y coordinate comparator 25. The AND circuit 27 outputs a value showing whether or not the coordinate in the image 7 is within the outer region 8*a* or the inner region 8*b* to the selection signal generating unit 30. For example, a value "0" (zero) is output from the AND circuit 27 when the Y coordinate is within the outer region 8*a*, and a value "1" is output from the AND circuit 27 when the Y coordinate is within the inner region 8*b*.

Other processes after that are conducted similarly as described above with reference to FIG. 3, and the explanation thereof will be omitted.

Figure 5:
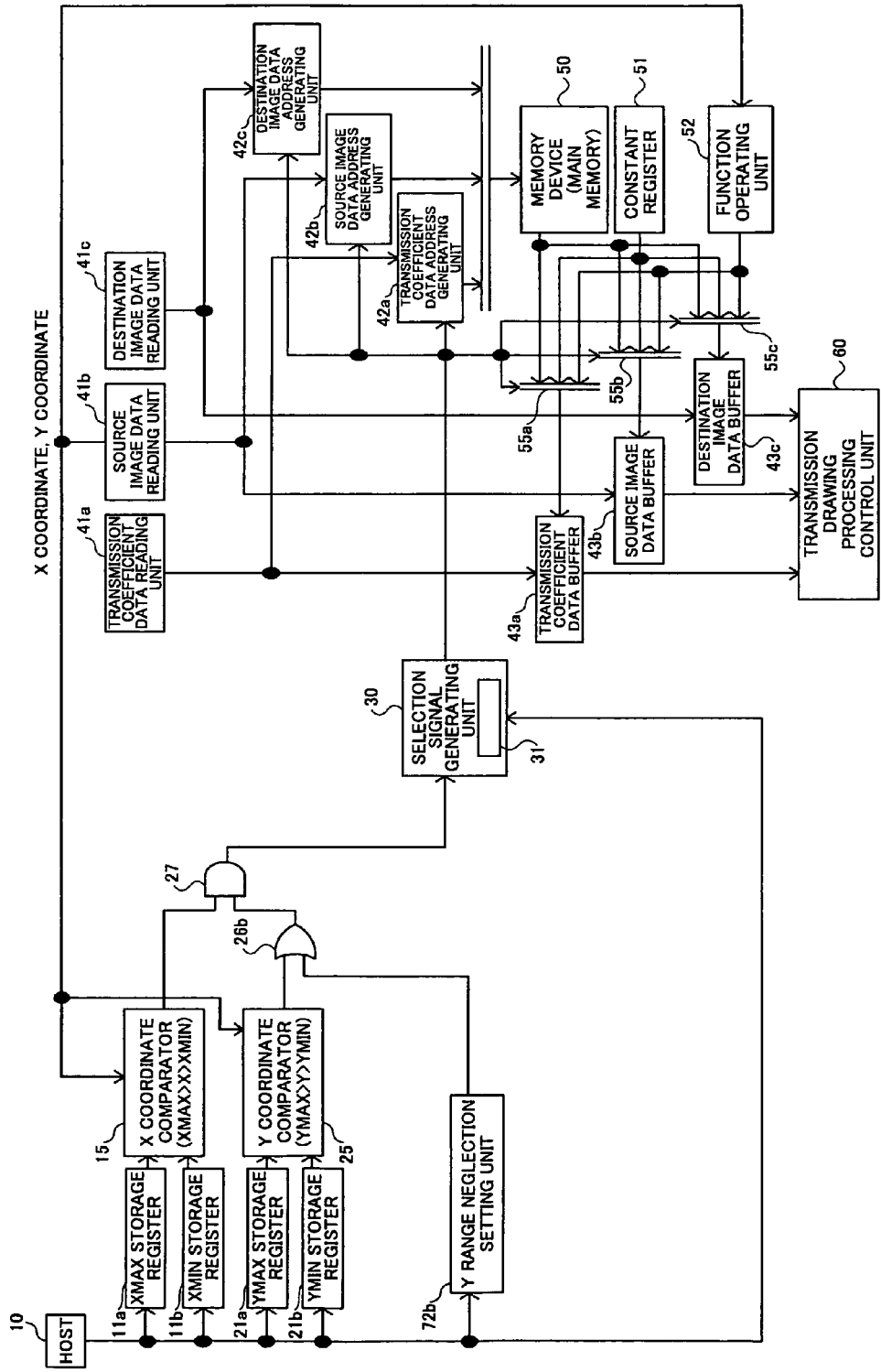
FIG. 5 is a block diagram showing a third circuit configuration of the image drawing apparatus according to the embodiment of the present invention.

Next, a case of neglecting a range of the Y coordinate informed from the host 10 will be described with reference to FIG. 5. FIG. 5 is a block diagram showing a third circuit configuration of the image drawing apparatus according to the embodiment of the present invention. In FIG. 5, elements that are the same as the ones in FIG. 3 are indicated by the same reference numerals and the explanation thereof will be omitted. The image drawing apparatus 100 shown in FIG. 5 includes a Y range neglection setting unit 72*b*, and an OR circuit 26*b* in addition to the first circuit configuration shown in FIG. 3.

The Y range neglection setting unit 72*b* is a register used to store a value informed from the host 10. The host 10 sets the value so that the Y coordinate being transferred always becomes within a range (that is, YMAX>Y>YMIN), regardless of the comparison result of the Y coordinate comparator 25. For example, the host 10 sets a value "1" into the Y range neglection setting unit 72*b*, so that the Y coordinate being transferred always becomes within the range, regardless of the comparison result of the Y coordinate comparator 25. On the other hand, the host 10 sets a value "0" (zero) into the Y range neglection setting unit 72*b*, when the comparison result showing whether or not the Y coordinate being transferred is available.

The OR circuit 26*b* is provided between the Y coordinate comparator 25 and the AND circuit 27. The OR circuit 26*b* conducts a logical addition with respect to the comparison result output from the Y coordinate comparator 25 and a value input from the Y range neglection setting unit 72*b*. Then, the OR circuit 26*b* sends a logic operation result to the AND circuit 27.

The AND circuit 27 conducts the logical product with respect to a value input from the OR circuit 26*b* and the comparison result of the X coordinate comparator 15. The AND circuit 27 outputs a value showing whether or not the coordinate in the image 7 is within the outer region 8*a* or the inner region 8*b* to the selection signal generating unit 30. For example, a value "0" (zero) is output from the AND circuit 27 when the X coordinate is within the outer region 8*a*, and a value "1" is output from the AND circuit 27 when the X coordinate is within the inner region 8*b*.

Other processes after that are conducted similarly as described above with reference to FIG. 3, and the explanation thereof will be omitted.

Figure 6:
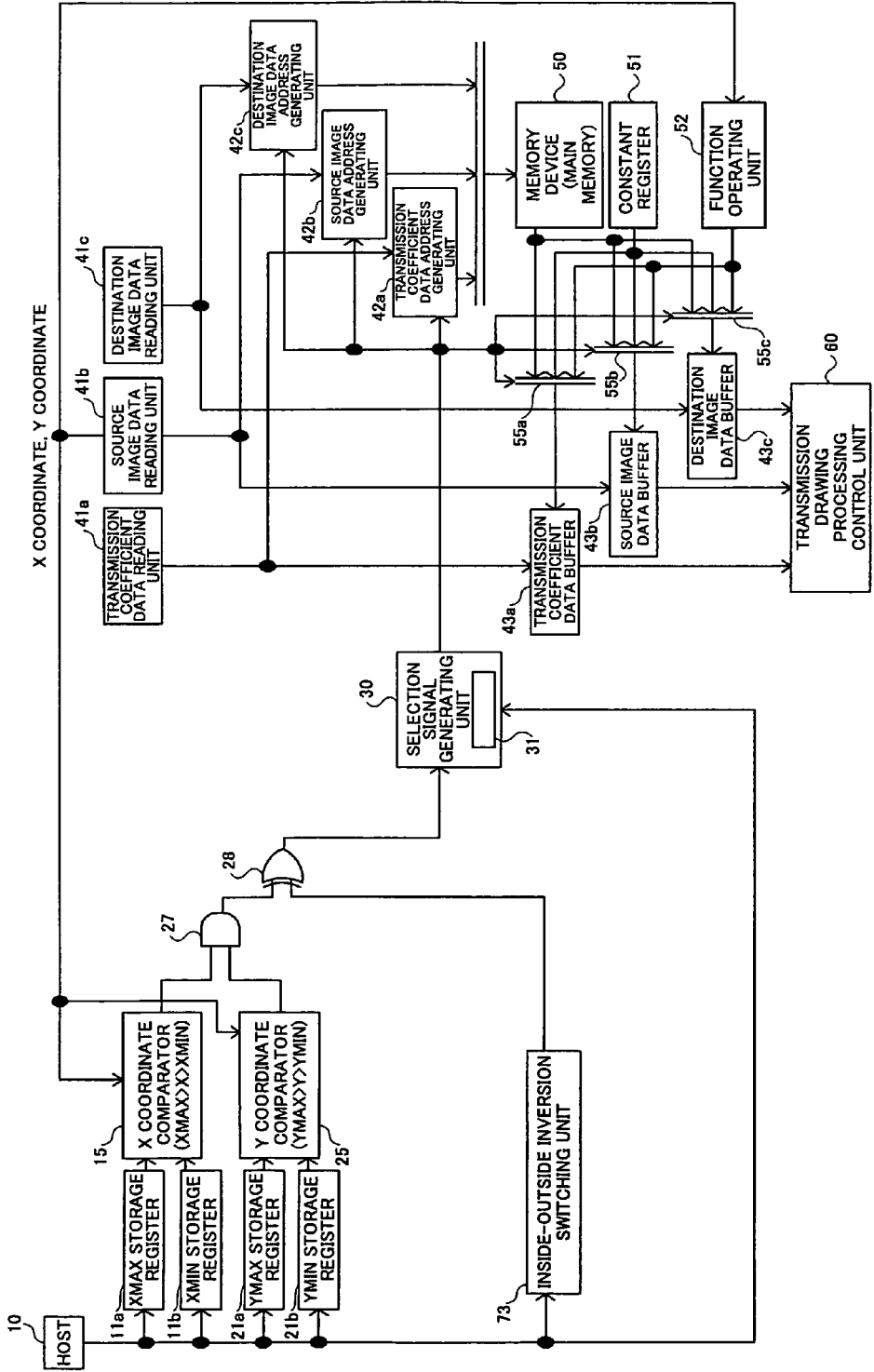
FIG. 6 is a block diagram showing a fourth circuit configuration of the image drawing apparatus according to the embodiment of the present invention.

Next, a case of inversing the transmission coefficient of the outer region 8*a* and the transmission coefficient of the inner region 8*b* will be described with reference to FIG. 6. FIG. 6 is a block diagram showing a fourth circuit configuration of the image drawing apparatus according to the embodiment of the present invention. In FIG. 6, elements that are the same as the ones in FIG. 3 are indicated by the same reference numerals and the explanation thereof will be omitted. The image drawing apparatus 100 shown in FIG. 6 includes an inside-outside inversion switching unit 73, and an EXOR circuit 28 in addition to the first circuit configuration shown in FIG. 3.

The inside-outside inversion switching unit 73 is a register used to store a value informed from the host 10. The host 10 sets the value so that the X coordinate and the Y coordinate in the outer region 8*a* and being transferred are inverted to be within the inner region 8*b* or so that the X coordinate and the Y coordinate in the inner region 8*b* and being transferred are inverted to be within the outer region 8*a*. For example, the host 10 sets a value "1", so that the above-described inversion is conducted. On the other hand, the host 10 sets a value "0" (zero), so that the above-described inversion is not conducted.

The EXOR circuit 28 is provided between the AND circuit 27 and the selection signal generating unit 30. The EXOR circuit 28 operates an exclusive OR with respect to a value output from the AND circuit 27 and a value input from the inside-outside inversion switching unit 73. Then, the EXOR circuit 28 sends a logic operation result to the selection signal generating unit 30.

Other processes after that are conducted similarly as described above with reference to FIG. 3, and the explanation thereof will be omitted.

In the fourth circuit configuration, when the X coordinate and the Y coordinate being transferred are within respective ranges, a constant transmission coefficient for the outer region 8a is applied. On the other hand, when either one of the X coordinate and the Y coordinate being transferred are out of the respective range, a transmission coefficient, which is not constant is applied.

Figure 7:
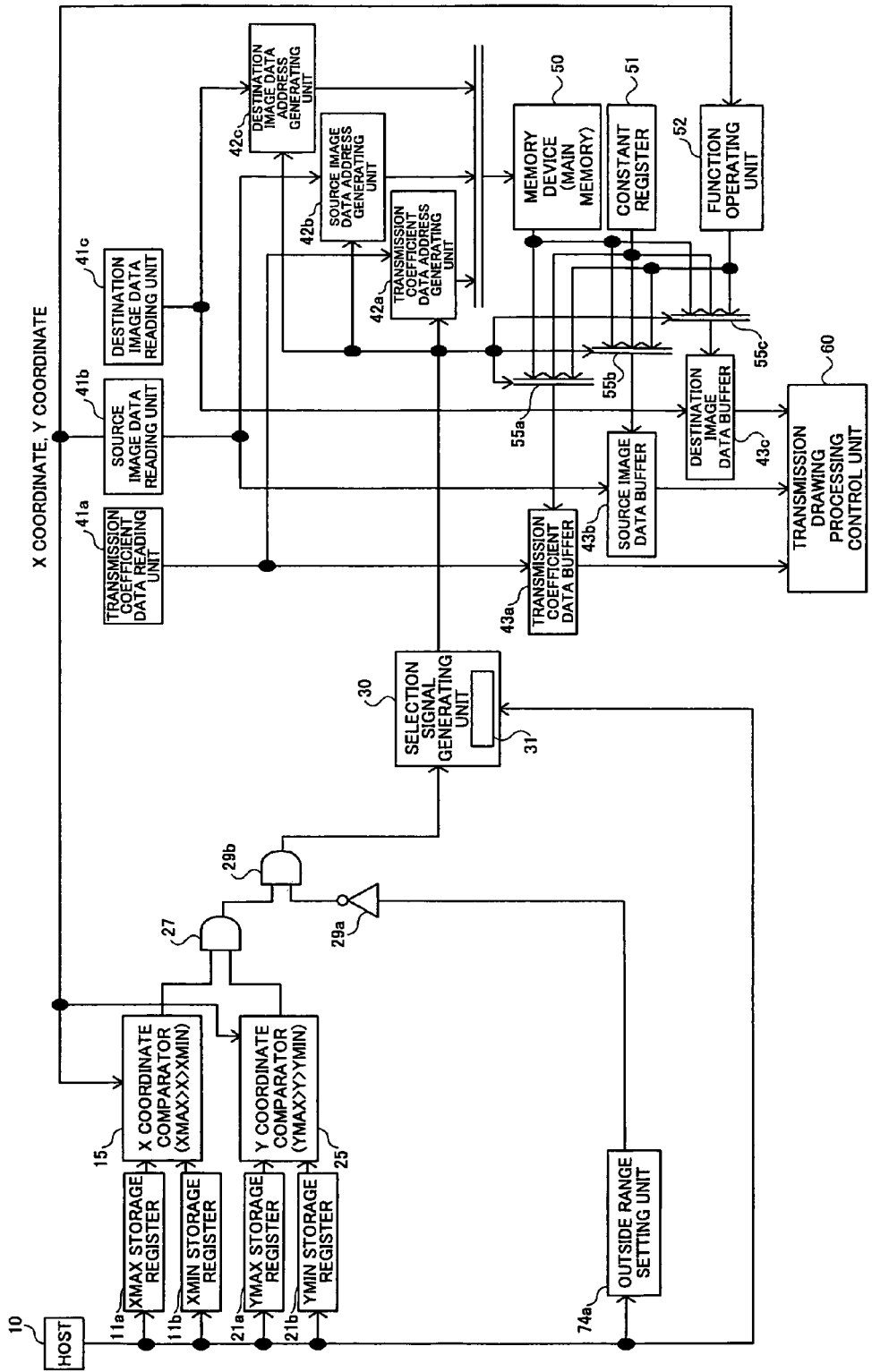
FIG. 7 is a block diagram showing a fifth circuit configuration of the image drawing apparatus according to the embodiment of the present invention.

Next, a case in that both the X coordinate and the Y coordinate being transferred are out of the respective ranges will be described with reference to FIG. 7. FIG. 7 is a block diagram showing a fifth circuit configuration of the image drawing apparatus according to the embodiment of the present invention. In FIG. 7, elements that are the same as the ones in FIG. 3 are indicated by the same reference numerals and the explanation thereof will be omitted. The image drawing apparatus 100 shown in FIG. 7 includes an outside range setting unit 74a, an inverter circuit 29a, and an AND circuit 29b in addition to the first circuit configuration shown in FIG. 3.

The outside range setting unit 74a is a register used to store a value informed from the host 10. The host 10 sets the value so that the X coordinate and the Y coordinate being transferred are always out of the respective ranges, regardless of the comparison result of the X coordinate comparator 15 and the comparison result of the Y coordinate comparator 25. For example, the host 10 sets a value "1", so that both the X coordinate and the Y coordinate being transferred always become out of the respective ranges. On the other hand, the host 10 sets a value "0" (zero), so that the comparison result of the X coordinate comparator 15 and the comparison result of the Y coordinate comparator 25 become available.

The inverter circuit 29a is provided between the outside range setting unit 74a and the AND circuit 29b. The inverter circuit 29a inverts a value input from the outside range setting unit 74a and outputs the value to the AND circuit 29b. For example, when the host 10 sets a value "1", a value "0" (zero) is output to the AND circuit 29b. On the other hand, the host 10 sets a value "0" (zero) a value "1" is output to the AND circuit 29b.

The AND circuit 29b is provided between the AND circuit 27 and the selection signal generating unit 30. The AND circuit 29b conducts a logical addition with respect to a value input from the AND circuit 27 and a value input from the outside range setting unit 74a. Then, the AND circuit 29b sends a logic operation result to the selection signal generating unit 30.

Other processes after that are conducted similarly as described above with reference to FIG. 3, and the explanation thereof will be omitted.

In the fifth circuit configuration, even if the X coordinate and the Y coordinate being transferred are within the respective ranges, the constant transmission coefficient for the outer region 8a is applied.

Figure 8:
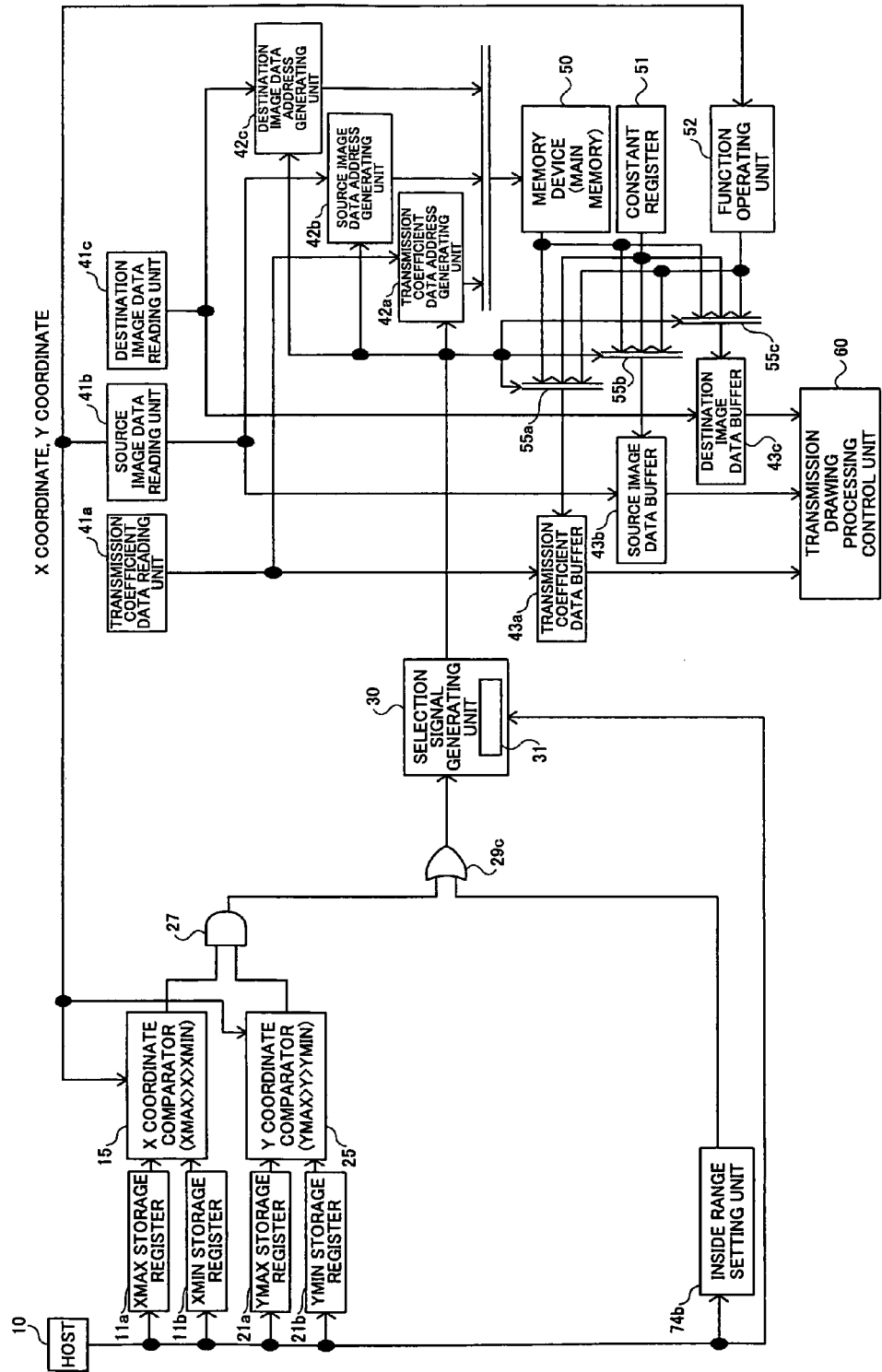
FIG. 8 is a block diagram showing a sixth circuit configuration of the image drawing apparatus according to the embodiment of the present invention.

Next, a case in that both the X coordinate and the Y coordinate being transferred are within the range informed from the host 10 will be described with reference to FIG. 8. FIG. 8 is a block diagram showing a sixth circuit configuration of the image drawing apparatus according to the embodiment of the present invention. In FIG. 8, elements that are the same as the ones in FIG. 3 are indicated by the same reference numerals and the explanation thereof will be omitted. The image drawing apparatus 100 shown in FIG. 8 includes an inside range setting unit 74b, and an AND circuit 29c in addition to the first circuit configuration shown in FIG. 3.

The inside range setting unit 74b is a register used to store a value informed from the host 10. The host 10 sets the value so that the X coordinate and the Y coordinate being transferred are always within the respective ranges, regardless of the comparison result of the X coordinate comparator 15 and the comparison result of the Y coordinate comparator 25. For example, the host 10 sets a value "1", so that both the X coordinate and the Y coordinate being transferred always become within the respective ranges. On the other hand, the host 10 sets a value "0" (zero), so that the comparison result of the X coordinate comparator 15 and the comparison result of the Y coordinate comparator 25 become available.

The AND circuit 29c is provided between the AND circuit 27 and the selection signal generating unit 30. The AND circuit 29c conducts a logical addition with respect to a value input from the AND circuit 27 and a value input from the inside range setting unit 74b. Then, the AND circuit 29c sends a logic operation result to the selection signal generating unit 30.

Other processes after that are conducted similarly as described above with reference to FIG. 3, and the explanation thereof will be omitted.

In the sixth circuit configuration, even if the X coordinate and the Y coordinate being transferred are out of the respective ranges, the transmission coefficient for the inner region 8b, which is not constant, is applied.

Next, a process conducted in the selection signal generating unit 30 will be described with reference to FIG. 9A and FIG. 9B. FIG. 9A and FIG. 9B are diagrams for explaining the process conducted in the selection signal generating unit according to the embodiment of the present invention. In FIG. 9A and FIG. 9B, the selection signal generating unit 30 stores a four bit value informed from the host 10 into the selection register 31. The selection signal generating unit 30 determines a value as a reference in response to an input signal showing "inside" (inner region 8b) or "outside" (outer region 8a) and sends an output signal as the selection signal.

For example, the input signal shows a value "1" to indicate "inside" and a value "0" to indicate "outside".

For example, the output signal indicates the means to obtain data by using two bits. A value "00" is indicated to refer a value stored in the memory device 50 (memory reference value), a value "01" is indicated to refer a value stored in the constant register 51 (register value), and a value "10" is indicated to refer a value stored in the function operating unit 52 (function value).

The four bit value is set by the host 10 indicates a value to refer as follows:

A four bit value "0000" indicates to use the memory reference value when the input signal indicates "inside", and to use the memory reference value when the input signal indicates "outside".

A four bit value "0001" indicates to use the memory reference value when the input signal indicates "inside", and to use the register value when the input signal indicates "outside".

A four bit value "0010" indicates to use the memory reference value when the input signal indicates "inside", and to use the function value when the input signal indicates "outside".

A four bit value "0011" indicates to use the register value when the input signal indicates "inside" (that is, the coordinate being transferred is in the inner region 8b), and to use the memory reference value when the input signal indicates "outside" (that is, the coordinate being transferred is in the outer region 8a).

A four bit value "0100" indicates to use the register value when the input signal indicates "inside", and to use the register value when the input signal indicates "outside".

A four bit value "0101" indicates to use the register value when the input signal indicates "inside", and to use the function value when the input signal indicates "outside".

A four bit value "0110" indicates to use the function value when the input signal indicates "inside", and to use the memory reference value when the input signal indicates "outside".

A four bit value "0111" indicates to use the function value when the input signal indicates "inside", and to use the register value when the input signal indicates "outside".

A four bit value "1000" indicates to use the function value when the input signal indicates "inside", and to use the function value when the input signal indicates "outside".

A case in that the four bit value "0001" is set into the selection register 31 by the host 10 will be described with reference to FIG. 9A. In FIG. 9A, the selection signal generating unit 30 outputs the output signal (out_signal) showing the two bit value "00" (memory reference value) when the input signal (in_signal) shows "1" (inside). On the other hand, the selection signal generating unit 30 outputs the output signal (out_signal) showing the two bit value "01" when the input signal (in_signal) shows "0" (zero) (outside).

Next, another case in that the four bit value "0110" is set into the selection register 31 by the host 10 will be described with reference to FIG. 9B. In FIG. 9B, the selection signal generating unit 30 outputs the output signal (out_signal) showing the two bit value "10" (function value) when the input signal (in_signal) shows the value "1" (inside). On the other hand, the selection signal generating unit 30 outputs the output signal (out_signal) showing the two bit value "00" (memory reference value) when the input signal (in_signal) shows the value "0" (zero) (outside).

Similar processes as described above are conducted for other four bit values, respectively.

Figure 10:
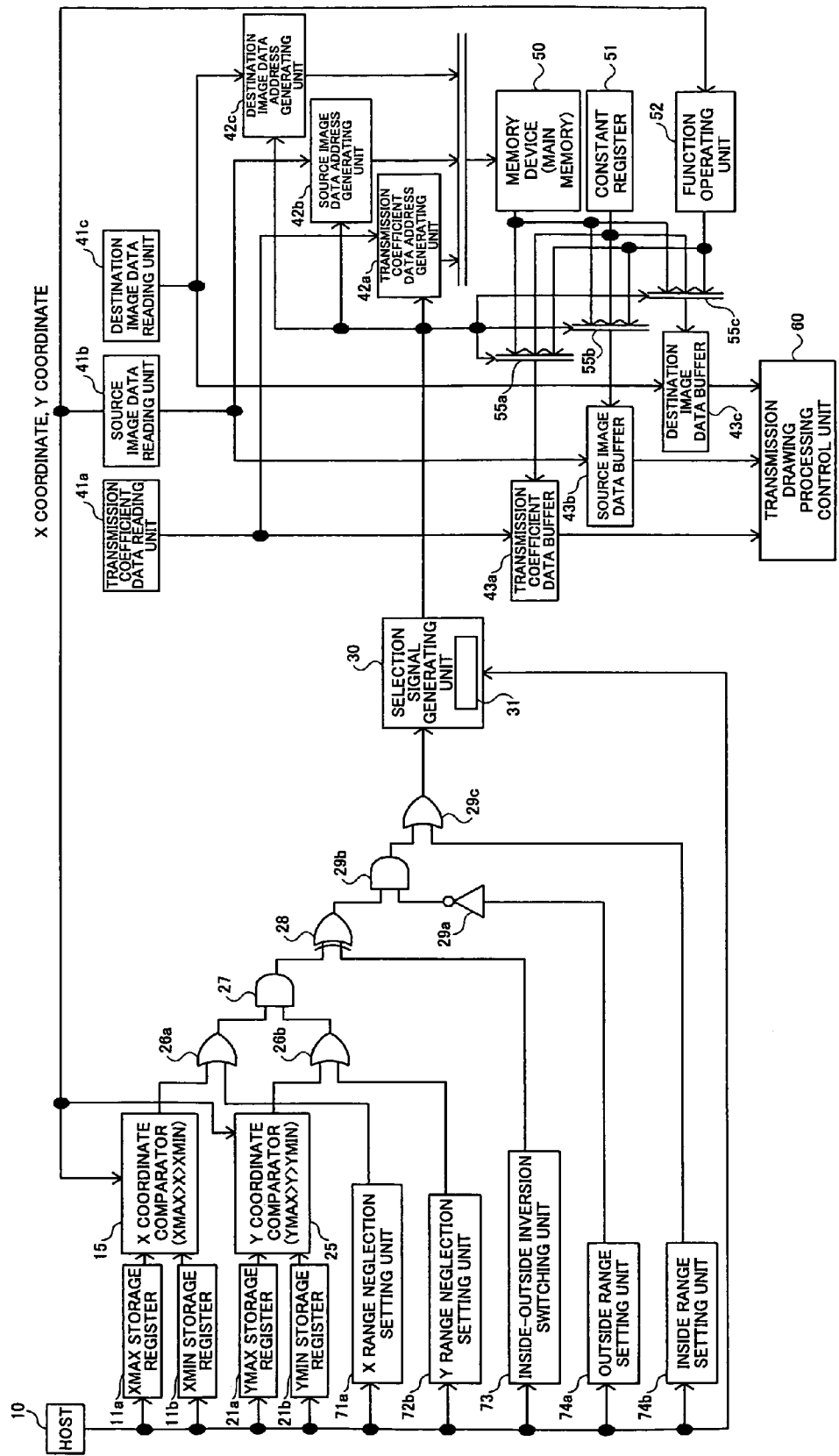
FIG. 10 is a block diagram showing a seventh circuit configuration of the image drawing apparatus according to the embodiment of the present invention.

Next, a circuit configuration including the first circuit configuration through the sixth circuit configuration will be described with reference to FIG. 10. FIG. 10 is a block diagram showing a seventh circuit configuration of the image drawing apparatus according to the embodiment of the present invention. In FIG. 10, elements that are the same as the ones shown in FIG. 3 through FIG. 8 are indicated by the same reference numerals and the explanation thereof will be omitted.

In FIG. 10, the OR circuit 26a inputs signals output from the X coordinate comparator 15 and the X range neglection setting unit 71a, and outputs the logic operation result obtained from the logical addition, to the AND circuit 27. The OR circuit 26b inputs signals output from the Y coordinate comparator 25 and the Y range neglection setting unit 72b, and outputs the logic operation result obtained from the logical product, to the AND circuit 27.

The AND circuit 27 inputs signals output from the OR circuit 26a and the OR circuit 26b, and outputs the logic operation result obtained from the logical product, to the EXOR circuit 28.

The EXOR circuit 28 inputs signals output from the AND circuit 27 and the inside-outside inversion switching unit 73, and outputs the logic operation result from operating the exclusive OR, to the AND circuit 29b.

The inverter circuit 29a inputs a signal output from the outside range setting unit 74a, inverts the signal, and outputs the signal being inverted to the AND circuit 29b. The AND circuit 29b inputs signals output from the EXOR circuit 28 and the inverter circuit 29a, and outputs a signal showing the logic operation result to the OR circuit 29c.

The OR circuit 29c inputs signals from the AND circuit 29b and the inside range setting unit 74b, and outputs a signal showing "inside" or "outside" as the logic operation results obtained from the logical addition, to the selection signal generating unit 30.

Other processes after that are conducted similarly as described above with reference to FIG. 3, and the explanation thereof will be omitted.

By configuring logic circuits as described above, functions realized by the first circuit configuration through the sixth circuit configuration can be realized in the single image drawing apparatus 100.

As described above, the host 10 sets the coordinate (XMIN, XMAX) of the upper left corner of the inner rectangle 7b and the coordinate (XMAX, YMIN) of the lower right corner of the outer rectangle 7a in order to compare with the coordinate being transferred. Alternatively, as shown in FIG. 11, the host 10 may set a lateral width Wx and a longitudinal width Wy showing a difference between the outer rectangle 7a and the inner rectangle 7b.

Figure 11:
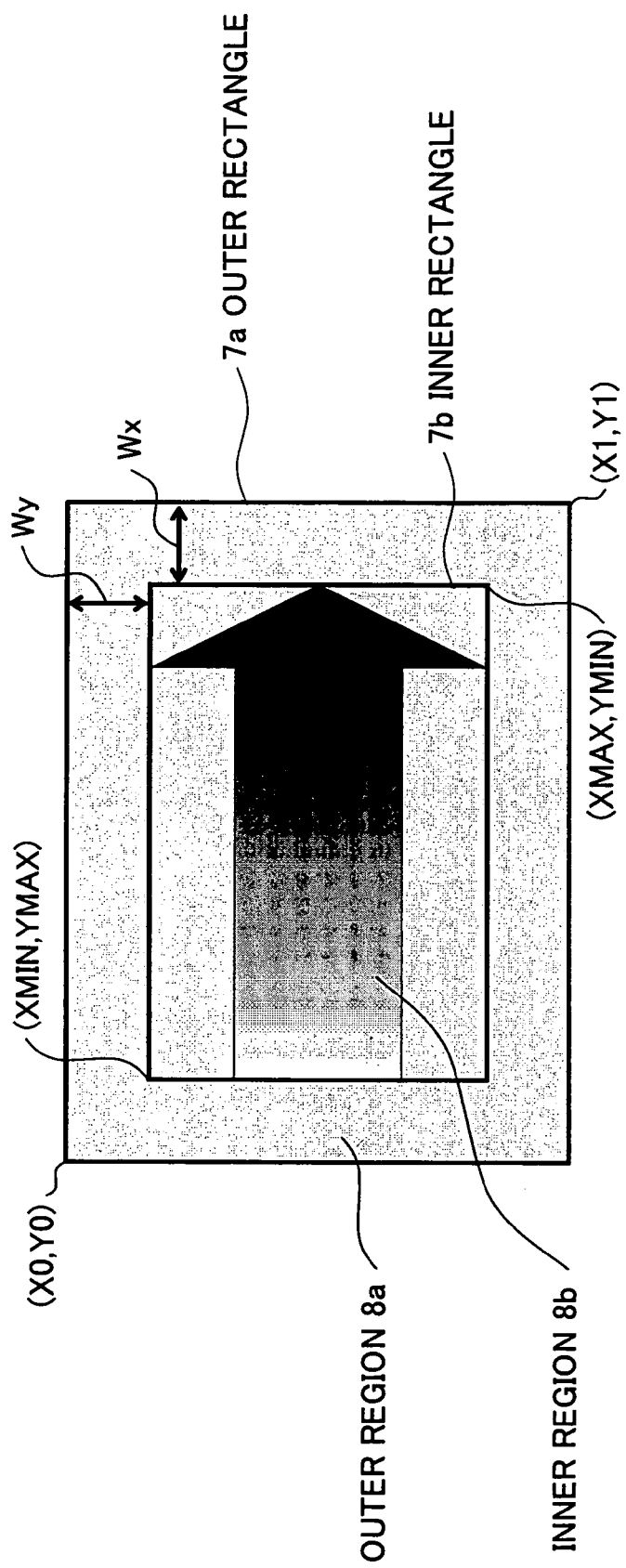
FIG. 11 is a diagram showing a method for setting coordinates of an inner rectangle according to the embodiment of the present invention.

FIG. 11 is a diagram showing a method for setting the coordinates of the inner rectangle according to the embodiment of the present invention. In the outer rectangle 7a in FIG. 11 showing an outer rectangle having the transmission coefficient, which is not constant, the coordinate of the upper left corner is (X0, Y0), and the coordinate of the lower right corner is (X1, Y1) Circuits may be configured so that XMAX is obtained by subtracting the lateral width Wx from an abscissa X1(XMAX=X1−Wx), and XMIN is obtained by adding the lateral width Wx to an abscissa X0(XMIN=X0−Wx), and similarly, YMAX is obtained by subtracting the longitudinal width Wy from an ordinate Y0(YMAX=Y0−Wy), and YMIN is obtained by adding the longitudinal width Wy to an ordinate Y1(YMIN=Y1−Wy).

Figure 12:
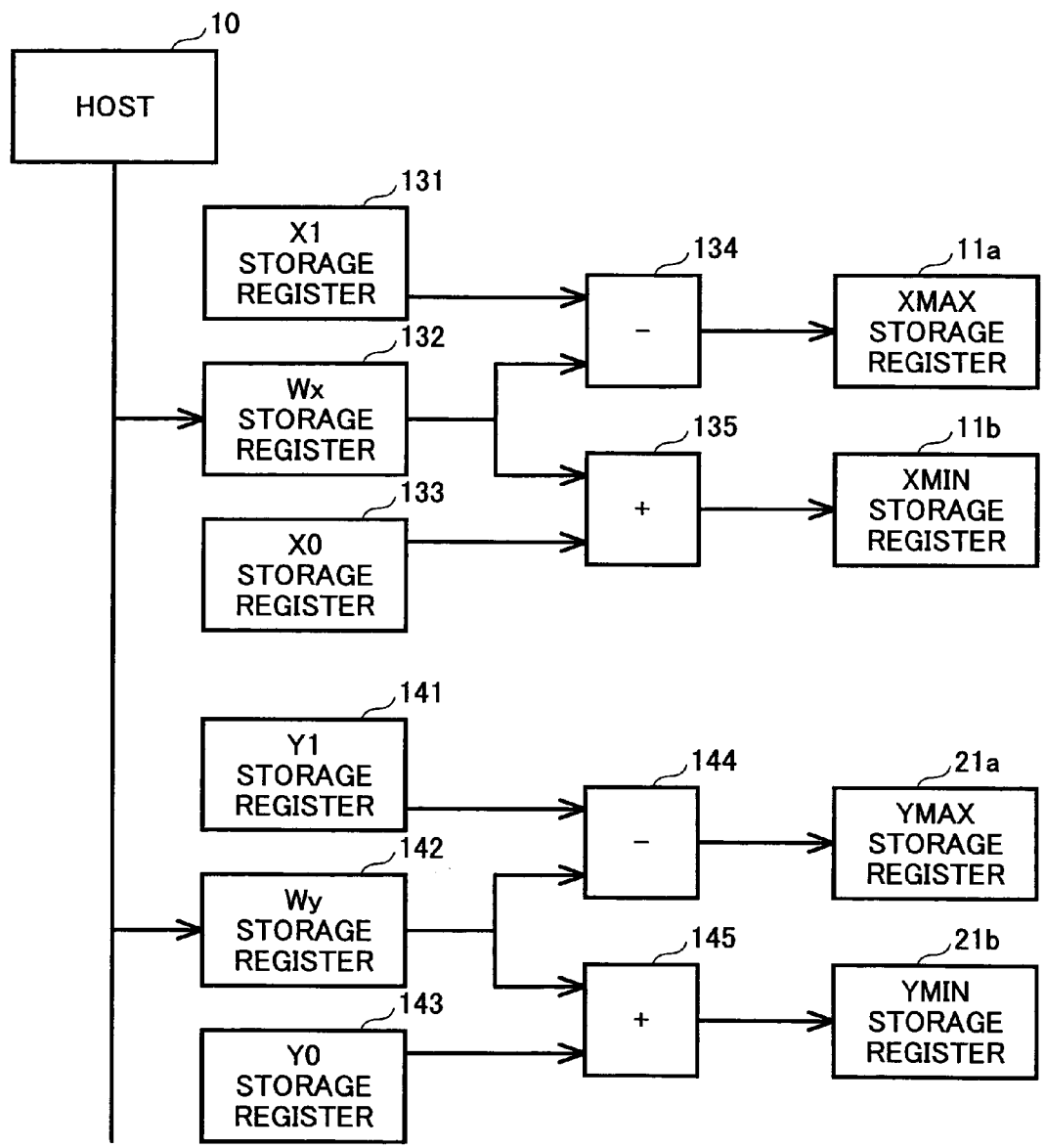
FIG. 12 is a diagram showing a circuit configuration for calculating the coordinates of the inner rectangle, according to the embodiment of the present invention.

For example, the above-described operation can be realized by configuring circuits as shown in FIG. 12. FIG. 12 is a diagram showing a circuit configuration for calculating the coordinates of the inner rectangle, according to the embodiment of the present invention.

In FIG. 12, an X1 storage register 131, a Wx storage register 132, an X0 storage register 133, a subtracter 134, and an adder 135 are additionally configured before the XMAX storage register 11a and the XMIN storage register 11b concerning the X coordinate of the inner rectangle 7b. An Y1 storage register 141, a Wy storage register 142, an Y0 storage register 143, a subtracter 144, and an adder 145 are additionally configured before the YMAX storage register 21a and the YMIN storage register 21b concerning the Y coordinate of the inner rectangle 7b.

The X1 storage register 131 is a register used to store the abscissa X1, the Wx storage register 132 is a register used to store the lateral width Wx, and the X0 storage register 133 is a register used to store the abscissa X0. The subtracter 134 receives a signal showing the abscissa X1 from the X1 storage register 131 and a signal showing the lateral width Wx from the Wx storage register 132, and outputs a logical operation result obtained by subtracting the lateral width Wx from the abscissa X1, to the XMAX storage register 11a. The adder 135 receives a signal showing the lateral width Wx from the Wx storage register 132 and a signal showing the abscissa X0 from the X0 storage register 133, and outputs a logical operation result obtained by adding the abscissa X0 to the lateral width Wx, to the XMIN storage register 11b.

The Y1 storage register 141 is a register used to store the ordinate Y1, the Wy storage register 142 is a register used to store the longitudinal width Wy, and the Y0 storage register 143 is a register used to store the ordinate Y0. The subtracter 144 receives a signal showing the ordinate Y1 from the Y1 storage register 141 and a signal showing the longitudinal width Wy from the Wy storage register 142, and outputs a logical operation result obtained by subtracting the longitudinal width Wy from the ordinate Y1, to the YMAX storage register 21*a*. The adder 145 receives a signal showing the longitudinal width Wy from the Wy storage register 142 and a signal showing the ordinate Y0 from the Y0 storage register 143, and outputs a logical operation result obtained by adding the ordinate Y0 to the longitudinal width Wy, to the YMIN storage register 21*b*.

When the lateral width Wx is the same as the longitudinal width Wy, either one of the Wx storage register 132 and the Wy storage register 142 may be omitted and one of the Wx storage register 132 and the Wy storage register 142 may be shared with the lateral width Wx and the longitudinal width Wy.

As described above, according to the present invention, since the inner region 8*b* of the inner rectangle 7*b* is simply indicted, that is, one setting is required to set a range for the bit block to transfer, the image 7 created by using the bitmap can be transferred with one BITBLT transfer. Accordingly, it is possible to realize the BITBLT transfer at higher speed.

As described above, the outer region 8*a* and the inner region 8*b* are defined by determining whether or not the transmission coefficient is constant in the image 7. Alternatively, the host 10 may determine and set at least one of a region where only the transmission coefficient is not constant, a region where only the pixel value is not constant, a region where the transmission coefficient or the pixel value is not constant, and a like. In each case, it is possible to realize the BITBLT transfer at higher speed by applying one of the first circuit configuration through the seventh circuit configuration. The pixel value may be a binary or a multiple-value for a color display using the YUV color space, the RGB color space, the YMCK color space, or a like.

In an image drawing apparatus displaying a digital color screen, at least one region in the image 7 is determined based on an attribute (the transmission coefficient and/or the pixel value) necessary to depict colors.

Moreover, the first circuit configuration is considered as the basic circuit configuration, and any functions additionally configured in the second circuit configuration through the sixth circuit configuration can be combined to form another circuit configuration.

For example, the present invention can be applied to a car navigation system, a mobile phone, a pachinko machine, or a like that displays a predetermined image for a menu screen or a like.

According to the present invention, in a case of the BITBLT transfer for an image including a portion where the transmission coefficient is constant and a portion where the transmission coefficient is not constant, it is possible to selectively switch to one of the memory device 50, the constant register 51, and the function operating unit 52 to obtain the transmission coefficient (or the pixel value) during the BITBLT transfer. Therefore, it is possible to reduce a memory amount and a data transfer amount for the BITBLT transfer.

The present invention is not limited to the specifically disclosed embodiments, and variations and modifications may be made without departing from the scope of the invention.

What is claimed is:

1. An image drawing apparatus in communication with a host and for conducting a data transfer at a bit unit for image data stored in a memory device, comprising:

a region storing part storing based upon a single coordinate instruction from the host, coordinate information of a single inside region of the image data where at least one attribute value concerning a pixel is not constant in the image data;

an attribute value storing part storing each attribute value of pixels in the single inside region;

a constant value storing part storing a constant value as the attribute value;

an inside region determining part determining whether a coordinate being transferred is within the single inside region;

a selection signal generating part generating a selection signal selecting reading an attribute value from the attribute value storing part and/or from the constant value storing part, based on the determining of whether the coordinate is within the single inside region; and reading the attribute value from the selected storing part for processing the source image data, wherein the inside region determining part further comprises:

a first comparison determining part determining whether the coordinate being transferred is within the single inside region by comparing a X coordinate being transferred with a first minimum value and a second maximum value of a X coordinate of the single inside region stored by the single coordinate instruction from the host, respectively, and a second comparison determining part determining whether the coordinate being transferred is within the single inside region by comparing a Y coordinate being transferred with a first minimum value and a second maximum value of a Y coordinate of the single inside region stored by the single coordinate instruction from the host, respectively, wherein the coordinate being transferred is within the single inside region when both results from the first comparison determining part and the second comparison determining part are within the single inside region.

2. The image drawing apparatus as claimed in claim 1, wherein the selection signal generating part further comprises a data storing part storing the storing part selection data indicating a first storing part to read the attribute value when the coordinate being transferred is within the single inside region and a second storing part to read the attribute value when the coordinate being transferred is out of the single inside region, in which the first storing part and the second storing part indicate either one of the attribute value storing part as a selected storing part or the constant value storing part, wherein the selection signal is generated based on the determining by the inside region determining part and the storing part selection data in the data storing part.

3. The image drawing apparatus as claimed in claim 2, further comprising a function operating part conducting a function operation to obtain the attribute value, wherein:

the data storing part stores the storing part selection data indicating the first storing part and the second storing part by identification information identifying one of the attribute value storing part, the constant value storing part, and the function operating part, respectively; and the selection signal generating part generates the selection signal based on the determining by the inside region determining part and the storing part selection data in the data storing part.

4. The image drawing apparatus as claimed in claim 1, wherein the inside range determining part further comprises a range obtaining part obtaining the first minimum value and the first maximum value of the X coordinate of the single inside region and the second minimum value and the second maximum value of the Y coordinate of the single inside region based on a peripheral difference between the image data and the single inside region.

5. The image drawing apparatus as claimed in claim 4, wherein the inside region determining part further comprises an X changing part changing the X coordinate being transferred to be within the range by operating a logical addition with respect to a result from the first comparison determining part.

6. The image drawing apparatus as claimed in claim 4, wherein the inside range determining part further comprises a Y changing part changing the Y coordinate being transferred by operating a logical addition with respect to a result from the second comparison determining part.

7. The image drawing apparatus as claimed in claim 6, wherein the inside region determining part comprises an inside region changing part changing a determination result indicating whether the coordinate being transferred is within the single inside region to indicate the coordinate is within the single inside region.

8. The image drawing apparatus as claimed in claim 1, wherein the inside region determining part further comprises:

an X range obtaining part obtaining the first minimum value and the first maximum value of the X coordinate of the single inside region based on a difference between peripheral lateral widths of the image data and the single inside region; and a Y range obtaining part obtaining the second minimum value and the second maximum value of the Y coordinate of the single inside region based on a difference between peripheral longitudinal widths of the image data and the single inside region.

9. The image drawing apparatus as claimed in claim 1, wherein the inside region determining part comprises an inverter inverting a determination result showing whether the coordinate being transferred is within the single inside region.

10. The image drawing apparatus as claimed in claim 1, wherein the inside region determining part comprises an outside range changing part changing a determination result indicating whether the coordinate being transferred is within the single inside region to indicate the coordinate is out of the single inside region.

11. The image drawing apparatus as claimed in claim 1, wherein the attribute value is a transmission coefficient or a pixel value.

12. A method of transferring data by a bit unit for image data stored in memory, comprising:

setting based upon a single coordinate instruction from a host, coordinate information of a single inside region of the image data where at least one attribute value concerning a pixel of the image data is not constant;

determining whether a transferring pixel coordinate is within the single inside region; and generating a selection signal transferring a stored non-constant attribute value and/or a stored constant value, based on the determining of whether the coordinate is within the single inside region, wherein the determination of whether the transferring pixel coordinate is within the single inside region further comprises determining whether the coordinate being transferred is within the single inside region by comparing a X coordinate being transferred with a first minimum value and a second maximum value of a X coordinate of the single inside region set by the single coordinate instruction from the host, respectively, determining whether the coordinate being transferred is within the single inside region by comparing a Y coordinate being transferred with a first minimum value and a second maximum value of a Y coordinate of the single inside region set by the single coordinate instruction from the host, respectively, and determining the coordinate being transferred is within the single inside region when both results from the X coordinate and Y coordinate comparisons are within the single inside region.

* * * * *